US007182423B2

(12) United States Patent
Su et al.

(10) Patent No.: US 7,182,423 B2
(45) Date of Patent: Feb. 27, 2007

(54) LEAKAGE DETECTION APPARATUS AND METHOD FOR MULTI-CHANNEL INKJET CARTRIDGE

(75) Inventors: Shyh-Haur Su, Hsinchu (TW); Hong-Wen Chang, Taichung (TW); Yung-Chin Lee, Houlong Township, Miaoli County (TW); Chu-Wen Chen, Hsinchu (TW); Po-Fu Chou, Taipei (TW); Chien-Tsung Wu, Taichung (TW); Chiu-Neng Chen, Dasi Township, Taoyuan County (TW)

(73) Assignees: Industrial Technology Research Institute, Hsinchu (TW); Phalanx Biotech Group, Inc., Taipei (TW)

( * ) Notice: Subject to any disclaimer, the term of this patent is extended or adjusted under 35 U.S.C. 154(b) by 218 days.

(21) Appl. No.: 10/730,179

(22) Filed: Dec. 8, 2003

(65) Prior Publication Data

US 2005/0122352 A1 Jun. 9, 2005

(51) Int. Cl.

| | |
|---|---|
| ***B41J 29/393*** | (2006.01) |
| ***B41J 2/175*** | (2006.01) |
| ***B65B 1/00*** | (2006.01) |
| ***G01M 3/04*** | (2006.01) |

(52) U.S. Cl. ............................ 347/19; 347/86; 141/31; 73/40

(58) Field of Classification Search ............. 137/15.11; 347/19; 141/31

See application file for complete search history.

(56) References Cited

U.S. PATENT DOCUMENTS

| | | | | |
|---|---|---|---|---|
| 5,369,420 | A * | 11/1994 | Bartky | 347/19 |
| 5,572,241 | A * | 11/1996 | Kanayama et al. | 347/7 |
| 5,855,713 | A * | 1/1999 | Harvey | 156/153 |
| 6,227,642 | B1 * | 5/2001 | Hanabusa et al. | 347/19 |
| 6,402,277 | B1 * | 6/2002 | Monclus et al. | 347/7 |
| 6,431,678 | B2 * | 8/2002 | Beck et al. | 347/19 |
| 6,679,582 | B2 * | 1/2004 | Silverbrook | 347/40 |
| 2005/0140751 | A1 * | 6/2005 | Chiao et al. | 347/85 |

FOREIGN PATENT DOCUMENTS

JP 10227466 A * 8/1998

OTHER PUBLICATIONS

Goepel, E. "The Ink Drop Sensor—A Means of Making Ink-Jet Printers More Reliable," CompEuro '89 'VLSI and Computer Peripherals. VLSI and Microelectronic Applications in Intelligent Peripherals and . . . ,' Proceedings. May 8-12, 1989, pp. 2/56-/60.*

* cited by examiner

*Primary Examiner*—Stephen Meier
*Assistant Examiner*—Shelby Fidler
(74) *Attorney, Agent, or Firm*—Thomas, Kayden, Horstemeyer & Risley

(57) ABSTRACT

A leakage detection apparatus and method for a multi-channel inkjet cartridge. The leakage detection apparatus includes a plurality of electrodes and a controller. Each of the electrodes is disposed in one of channels of the inkjet cartridge respectively, and contacts a reagent in the corresponding channel. The controller is coupled to the electrodes, and detects leakage between channels.

10 Claims, 7 Drawing Sheets

LEAKAGE DETECTION APPARATUS AND METHOD FOR MULTI-CHANNEL INKJET CARTRIDGE

BACKGROUND OF THE INVENTION

1. Field of the Invention

The invention relates to a leakage detection apparatus and method, and in particular, the invention relates to a leakage detection apparatus and method for a multi-channel inkjet cartridge.

2. Description of the Related Art

Advances in industries employing chemical and biological processes have created a need for devices that accurately and automatically dispense small quantities of liquids containing chemically or biologically active substances for commercial or experimental use. Accuracy and precision in the amount of liquid dispensed is important both from the standpoint of causing a desired reaction and minimizing the amount of material used. An example of a device with an array of reagents disposed thereupon is a biochip.

Many conventional dispensing methods that can cause a desired reaction and minimize the amount of material are disclosed, for example, in U.S. Pat. No. 5,551,487, U.S. Pat. No. 5,807,522, U.S. Pat. No. 6,110,426, WO 02/16021, and U.S. Pat. No. 6,458,583. From the standpoint of reliability, it is important to prevent different reagents from intermixing during dispensing, thus affecting detection results.

In view of this, a multi-channel inkjet cartridge with replaceable capillary tubes is disclosed, thus preventing intermixing of different reagents. As shown in FIG. 1, the multi-channel inkjet cartridge 10 includes a base 11, a chip 12, a nozzle plate 13, and a plurality of capillary tubes 14. It is noted that the nozzle plate 13 adheres to the chip 12 via a barrier layer (not shown). The chip 12 also adheres to the base 11, and the capillary tubes 14 which are disposed in the base 11 in a replaceable manner. It is understood that the leakage between different reagents may occur between the base and the chip, between the chip and the barrier layer, or between the barrier layer and the nozzle plate. However, there is no leakage detection apparatus and method for a multi-channel inkjet cartridge.

U.S. Pat. No. 6,431,678 discloses an ink leakage detection apparatus. Referring to FIGS. 2*a*–2*b*, detectors 21 are formed around contact pads 22 such that the leakage of ink onto both the detector 21 and power and control lines 23 causes a voltage to be propagated through the conductive ink to the detector 21. The detector 21 is in turn coupled to the detection circuit which outputs an ink leakage signal upon receipt of a voltage from a power or a control line 24 or other source. Thus, leakage detection can be performed. It is understood that the inkjet print head 20 includes a chip 25, a barrier layer 26, and a nozzle plate 27.

Although the apparatus disclosed in U.S. Pat. No. 6,431,678 can detect leakage in some inkjet print heads, it is not applicable to a multi-channel inkjet cartridge as shown in FIG. 1. Specifically, the detection apparatus shown in FIGS. 2*a*–2*b* cannot determine which channel is leaking. Additionally, it cannot detect leakage between the base 11 and the chip 12 as shown in FIG. 1.

SUMMARY OF THE INVENTION

In view of this, the invention provides a leakage detection apparatus and method for a multi-channel inkjet cartridge.

Accordingly, the invention provides a leakage detection apparatus for a multi-channel inkjet cartridge. The leakage detection apparatus includes a plurality of electrodes and a controller. Each of the electrodes is disposed in one of channels of the inkjet cartridge respectively, and contacts a reagent in the corresponding channel. The controller is coupled to the electrodes, and detects leakage between channels.

In a preferred embodiment, the controller includes a voltage supply device, a detection circuit, and a display. The voltage supply device provides voltage to one of the electrodes at a time, and is coupled to the electrodes via the detection circuit. The detection circuit couples any two of the electrodes. The display displays leakage detection results.

In the invention, an inkjet dispensing apparatus is provided. The inkjet dispensing apparatus includes a cartridge, a chip, a plurality of electrodes, and a controller. The cartridge includes a plurality of channels. Reagents are received in the channels. The chip is disposed on the cartridge, and includes a plurality of first through holes communicating with one of the channels respectively. Each of the electrodes is disposed in one of the channels of the cartridge respectively, and contacts the reagent in the corresponding channel. The controller is coupled to the electrodes, and detects leakage between channels.

It is understood that the chip may be made of glass, or covered by an electric-isolating layer.

In a preferred embodiment, the inkjet dispensing apparatus further includes a barrier layer and a nozzle plate. The barrier layer is disposed on the chip, and includes a plurality of second through holes communicating with the first through holes respectively. The nozzle plate is disposed on the barrier layer, and includes a plurality of orifices communicating with the second through holes respectively.

It is understood that the nozzle plate may be made of polyimide.

In the invention, a leakage detection method is provided. The method includes the following steps. First, an inkjet cartridge, a plurality of electrodes, and a controller are provided. The inkjet cartridge includes a chip and a plurality of channels, reagents are received in the channels, and the electrodes are coupled to the controller. The electrodes are then inserted into one of the channels of the inkjet cartridge respectively so that each of the electrodes contacts the reagent in the corresponding channel. The controller detects leakage between channels via the electrodes.

In a preferred embodiment, the method further includes the following steps. After the electrodes are inserted into the channels, the controller provides voltage to one of the electrodes at a time. After the controller detects the leakage, the controller displays leakage detection results.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
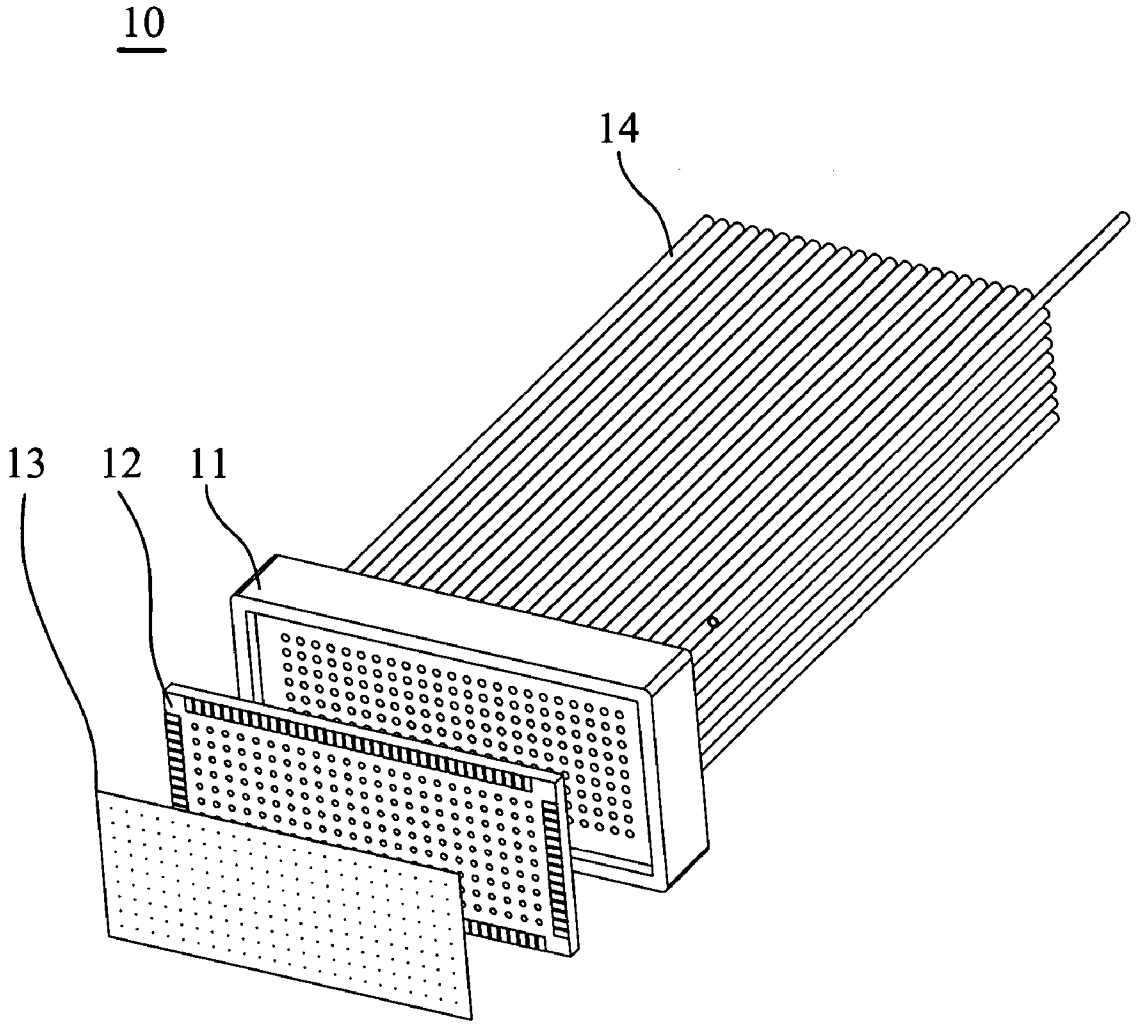
FIG. 1 (RELATED ART)
FIG. 1 is an exploded view of a conventional multi-channel inkjet cartridge with replaceable capillary tubes.
Figure 2A:
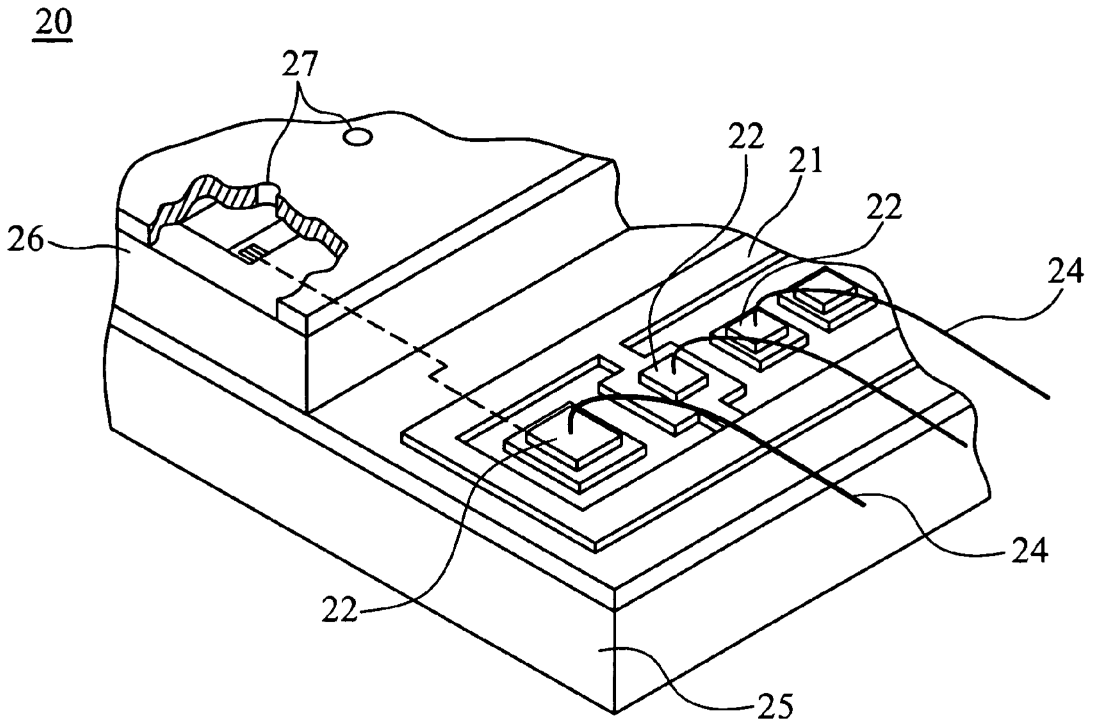
FIG. 2a (RELATED ART)
FIG. 2*a* is a partial cutaway isometric view of an inkjet printhead as disclosed in U.S. Pat. No. 6,431,678.
Figure 2B:
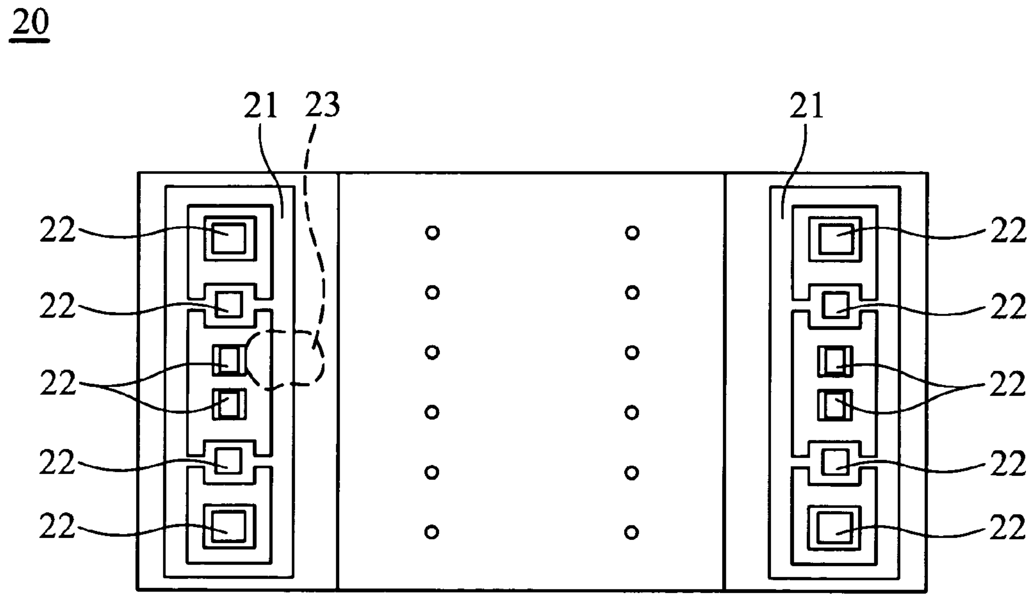
FIG. 2b (RELATED ART)
FIG. 2*b* is a top view of the inkjet print head in FIG. 2*a*.
Figure 3:
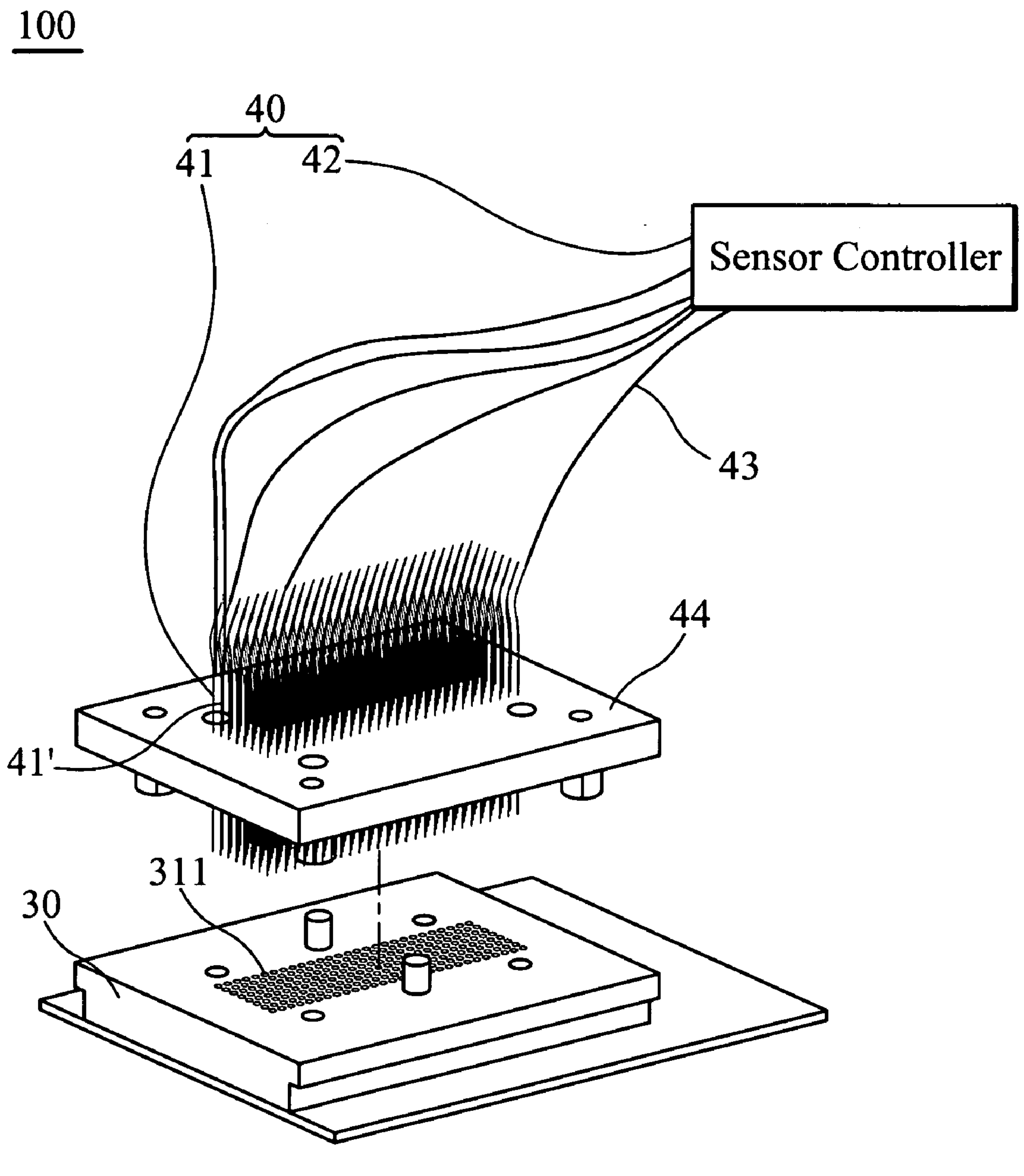
FIG. 3 is a schematic view showing an inkjet dispensing apparatus as disclosed in the invention.

Referring to FIG. 3, an inkjet dispensing apparatus 100 as disclosed in the invention is provided. The inkjet dispensing apparatus 100 includes an inkjet print head 30 and a leakage detection apparatus 40.

Figure 4:
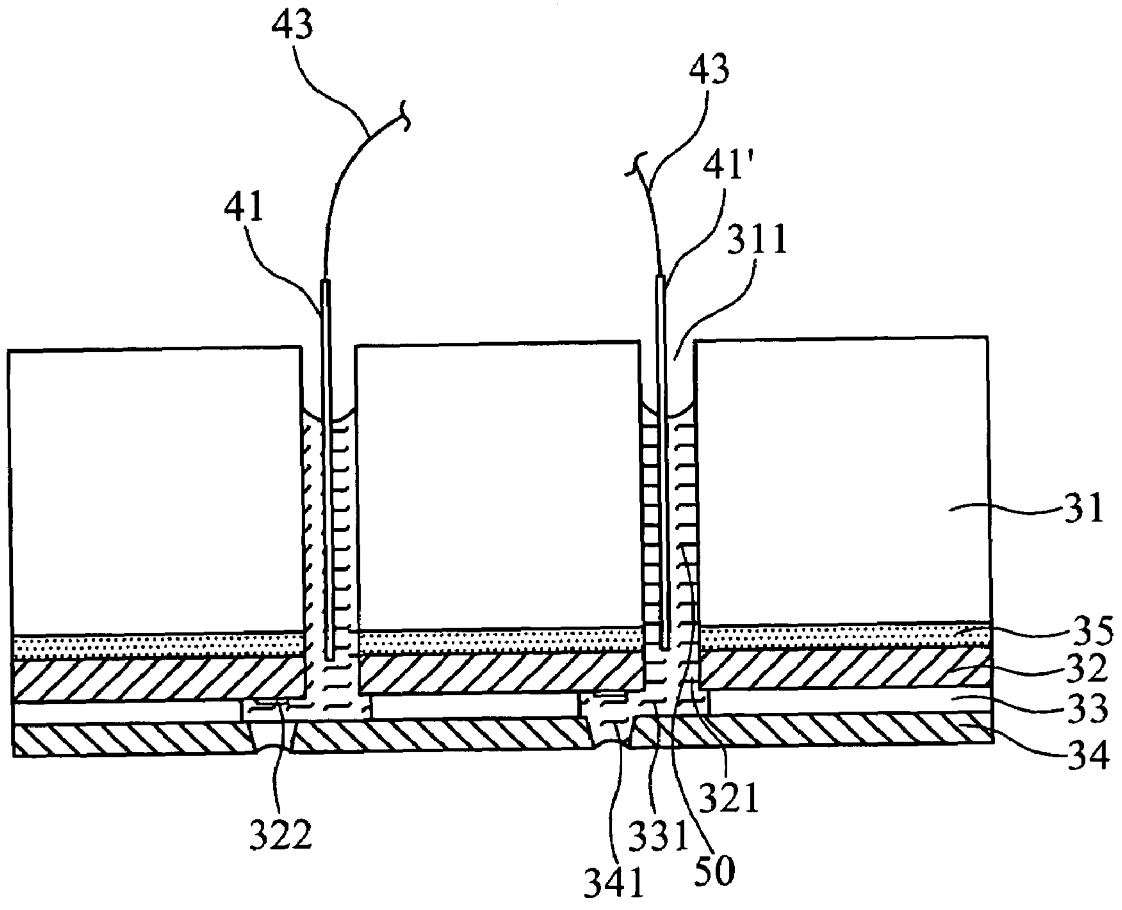
FIG. 4 is a cross section of an inkjet print head in FIG. 3.

As shown in FIG. 4, the inkjet print head 30 includes a multi-channel cartridge 31, a chip 32, a barrier layer 33, and a nozzle plate 34. The cartridge 31 serves as a base of the inkjet print head 30, and includes a plurality of channels 311 therein. Reagents 50 are received in the channels 311. The chip 32 serves as a driving mechanism for dispensing the reagents 50 in the channels 311, and is adhered to the cartridge 31 with glue 35. The chip 32 includes a heater 322 and a plurality of first through holes 321 communicating with each of the channels 311 respectively. Preferably, the chip 32 may, be made of glass. Alternatively, the chip 32 may be made of silicon and covered by an electric-isolating layer.

The barrier layer 33 is disposed on the chip 32, and connects the chip 32 and the nozzle plate 34. The barrier layer 33 includes a plurality of second through holes 331 communicating with the first through holes 321 of the chip 32 respectively. The nozzle plate 34 is disposed on the barrier layer 33, and includes a plurality of orifices 341 communicating with the second through holes 331 respectively. Preferably, the nozzle plate 34 may be made of polyimide.

As shown in FIG. 3, the leakage detection apparatus 40 includes a plurality of electrodes 41, and a controller 42. Each of the electrodes 41 is disposed in one of the channels 311 of the cartridge 31 respectively, and contacts the reagent 50 in the corresponding channel 311.

Figure 5:
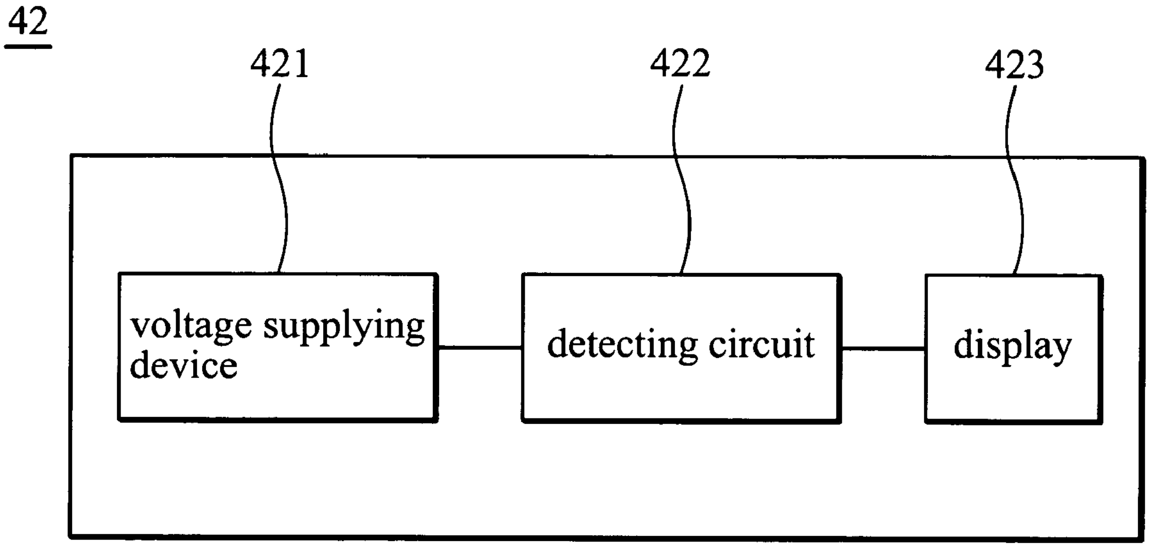
FIGS. 5–6 are schematic views showing a controller in FIG. 3.
Figure 6:
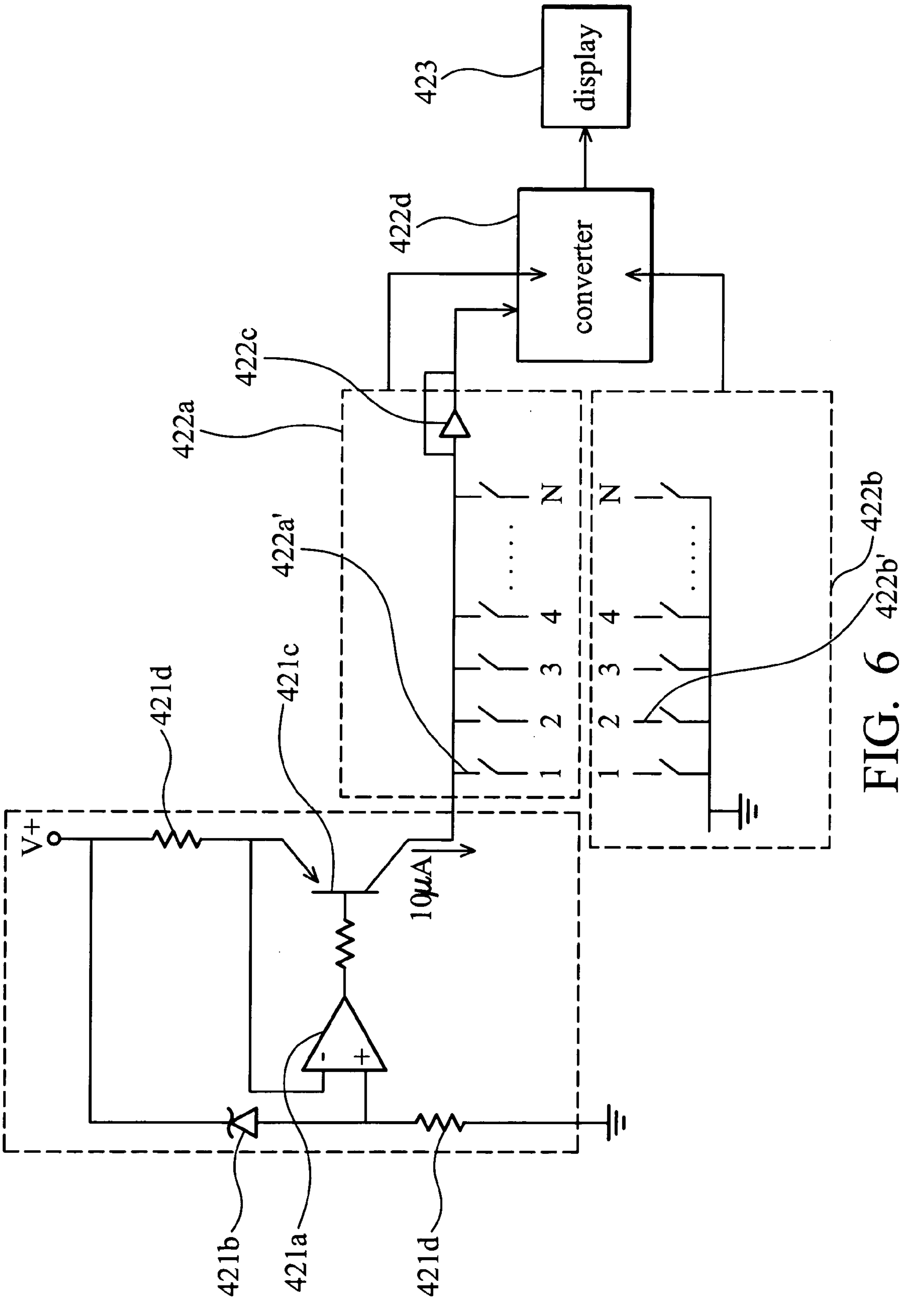

The controller 42 is coupled to the electrodes 41, and detects leakage between channels 311 of the cartridge 31. As shown in FIG. 5 and FIG. 6, the controller 42 includes a voltage supply device 421, a detection circuit 422, and a display 423. The voltage supply device 421 provides voltage to one of the electrodes 41 at a time via a multiplexer 422*a* of the detection circuit 422, and is coupled to the electrodes 41 via the detection circuit 422. For example, the voltage supply device 421 may include a comparator 421*a*, a Zener diode 421*b*, a bipolar transistor 421*c*, and a plurality of resistances 421*d* as shown in FIG. 6. The detection circuit 422 couples any two of the electrodes 421, and detects the value of the current or the resistance due to the leakage between the channels 311. For example, the detection circuit 422 may include two multiplexers 422*a*, 422*b*, an amplifier 422*c*, and a converter 422*d*. Each of the multiplexer 422*a*, 422*b* includes a plurality of relays respectively. Each of the relays is coupled to the electrode respectively. For instance, the relay 422*a'* is coupled to the electrode 41, and the relay 422*b'* is coupled to the electrode 41'. When the relays 422*a'*, 422*b'* are turned on, the leakage between the channels 31 receiving the electrodes 41, 41' can be detected. The display 423 displays leakage detection results.

Specifically, in normal situations, since the channels 311 of the cartridge 31 are independent from each other, there is no current generated between the channels 311 via the electrodes 41 in the corresponding channels 311. When a gap is generated between the channels 311, current may be generated via the leaked reagents 50. Thus, the generated current passes through the electrodes 41 and the detection circuit 422, and is acknowledged by the display 423. Moreover, as the voltage supply device 421 provides voltage to one of the electrodes 41 at a time, the controller 42 can detect two of the channels 311 at a time.

Referring to FIG. 3, the leakage detection apparatus 40 may further include a plurality of cables 43 and a support 44. Each of the cables 43 is connected to the controller 42 and one of the electrodes 41 respectively. The electrodes 41 are disposed in the support 44 so as to be conveniently inserted into the channels 311. It is noted that only four cables 43 are shown in FIG. 3 to simplify the figure.

Figure 7:
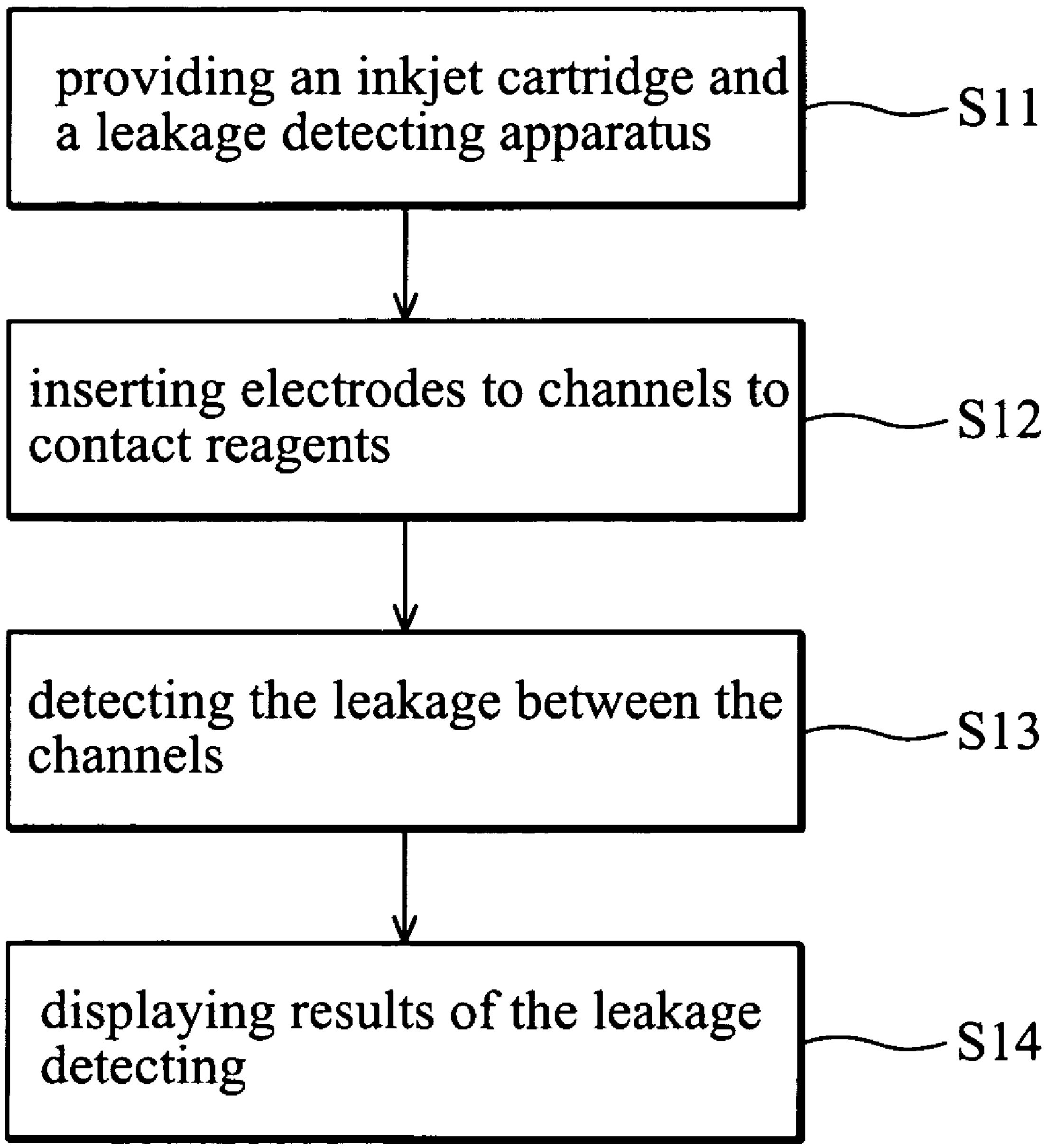
FIG. 7 is a flowchart of a leakage detection method as disclosed in the invention.

Referring to FIG. 7, a leakage detection method as disclosed in the invention includes the following steps. In step S11 of FIG. 7, the inkjet cartridge 30 and the leakage detection apparatus 40 are provided. In step S12 of FIG. 6, each of the electrodes 41 is then inserted to one of the channels 311 of the cartridge 31 respectively so that each of the electrodes 41 contacts the reagent 50 in the corresponding channel 311. Sequentially, in step S13 of FIG. 7, the voltage supply device 421 of the controller 42 provides voltage to one of the electrodes 41. At the same time, the detection circuit 422 of the controller 42 detects leakage between channels 311 via the neighborhood electrodes 41'. Finally, in step S14 of FIG. 7, the display 423 of the controller 42 displays leakage detection results.

It is noted that the reagent is usually conductible. If the reagent is not conductible, a conductible liquid can be added to the channel prior to leakage detection.

By the apparatus and the method of the invention, the leakage between the channels of the inkjet print head can be determined, thus preventing reagents from intermixing. In addition, the leakage position can be accurately located so as to maintain the reliability of the inkjet print head. Moreover, unlike the conventional leakage detection apparatus, the leakage between the cartridge and the chip can be detected by the invention.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A leakage detection apparatus for a multi-channel inkjet cartridge comprising:

a plurality of electrodes disposed in channels of the inkjet cartridge on a one-to-one corresponding basis, such that only one of the electrodes is disposed in a given one of the multi-channels of the inkjet cartridge, and contacts a reagent in the corresponding channel; and a controller, coupled to the electrodes, to detect leakage between channels, comprising a voltage supply device for providing voltage to one of the electrodes at a time.

2. The leakage detection apparatus as claimed in claim 1, wherein the controller includes a detection circuit for coupling any two of the electrodes, and the voltage supply device is coupled to the electrodes via the detection circuit.

3. The leakage detection apparatus as claimed in claim 1, wherein the controller includes a display to display leakage detection results.

4. An inkjet dispensing apparatus comprising:

a cartridge including a plurality of channels, wherein reagents are received in the channels;

a chip, disposed on the cartridge, including a plurality of first through holes communicating with one of the channels respectively;

a plurality of electrodes disposed in channels of the inkjet cartridge on a one-to-one corresponding basis, such that only one of the electrodes is disposed in a given one of the multi-channels of the inkjet cartridge, and contacts a reagent in the corresponding channel; and a controller, coupled to the electrodes, to detect leakage between channels, comprising a voltage supply device for providing voltage to one of the electrodes at a time.

5. The inkjet dispensing apparatus as claimed in claim 4, wherein the chip is made of glass.

6. The inkjet dispensing apparatus as claimed in claim 4, wherein the chip is covered by an electric-isolating layer.

7. The inkjet dispensing apparatus as claimed in claim 4, further comprising:

a barrier layer, disposed on the chip, including a plurality of second through holes communicating with the first through holes respectively; and a nozzle plate, disposed on the barrier layer, including a plurality of orifices communicating with the second through holes respectively.

8. The inkjet dispensing apparatus as claimed in claim 7, wherein the nozzle plate is made of polyimide.

9. The inkjet dispensing apparatus as claimed in claim 4, wherein the controller includes a detection circuit for coupling any two of the electrodes, and the voltage supply device is coupled to the electrodes via the detection circuit.

10. The inkjet dispensing apparatus as claimed in claim 4, wherein the controller includes a display to display leakage detection results.

* * * * *